US012703664B2

(12) United States Patent
Lin et al.

(10) Patent No.: US 12,703,664 B2
(45) Date of Patent: Aug. 11, 2026

(54) NANOPOROUS CERAMIC FOR ATOMIZATION CORE AND PREPARATION METHOD THEREOF

(71) Applicant: HUIZHOU HAPPY VAPING TECHNOLOGY LIMITED, Huizhou (CN)

(72) Inventors: Guangrong Lin, Huizhou (CN); Fei Qin, Huizhou (CN); Weili Liu, Huizhou (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 531 days.

(21) Appl. No.: 18/211,287

(22) Filed: Jun. 18, 2023

(65) Prior Publication Data

US 2023/0331632 A1 Oct. 19, 2023

Related U.S. Application Data

(63) Continuation of application No. PCT/CN2021/128933, filed on Nov. 5, 2021.

(30) Foreign Application Priority Data

Dec. 18, 2020 (CN) ......................... 202011507967.0
Dec. 25, 2020 (CN) ......................... 202011561865.7

(51) Int. Cl.

| | |
|---|---|
| ***C04B 33/04*** | (2006.01) |
| ***A24F 40/46*** | (2020.01) |
| ***A24F 40/70*** | (2020.01) |
| ***C04B 33/13*** | (2006.01) |
| ***C04B 33/30*** | (2006.01) |
| ***C04B 33/32*** | (2006.01) |
| ***C04B 38/06*** | (2006.01) |

(52) U.S. Cl.

CPC .............. *C04B 33/04* (2013.01); *A24F 40/46* (2020.01); *A24F 40/70* (2020.01); *C04B 33/1305* (2013.01); *C04B 33/131* (2013.01); *C04B 33/1315* (2013.01); *C04B 33/30* (2013.01); *C04B 33/32* (2013.01); *C04B 38/068* (2013.01); *C04B 2235/3418* (2013.01); *C04B 2235/3427* (2013.01); *C04B 2235/349* (2013.01); *C04B 2235/5292* (2013.01); *C04B 2235/5445* (2013.01); *C04B 2235/606* (2013.01); *C04B 2235/6562* (2013.01); *C04B 2235/6567* (2013.01); *C04B 2235/6582* (2013.01)

(58) Field of Classification Search

CPC .... C04B 2235/3201; C04B 2235/3418; C04B 2235/3427; C04B 2235/349; C04B 2235/5292; C04B 2235/5445; C04B 2235/5454; C04B 2235/606; C04B 2235/6562; C04B 2235/6567; C04B 2235/658; C04B 2235/6582; C04B 33/04; C04B 33/1305; C04B 33/131; C04B 33/1315; C04B 33/30; C04B 33/32; C04B 35/632; C04B 38/0054; C04B 38/0645; C04B 38/067; C04B 38/068

See application file for complete search history.

(56) References Cited

U.S. PATENT DOCUMENTS

2020/0317585 A1 10/2020 Ding et al.

FOREIGN PATENT DOCUMENTS

| | | | |
|---|---|---|---|
| CN | 108892533 | A | 11/2018 |
| CN | 109400203 | A | 3/2019 |
| CN | 111138175 | A | 5/2020 |
| CN | 111205104 | A | 5/2020 |
| CN | 112545066 | A | 3/2021 |
| CN | 112790445 | A | 5/2021 |
| JP | S59174571 | A | 10/1984 |
| JP | 2015221737 | A | 12/2015 |

OTHER PUBLICATIONS

CN108892533A translation (Year: 2018).*
International Search Report of PCT Patent Application No. PCT/CN2021/128933 issued on Jan. 27, 2022.

* cited by examiner

*Primary Examiner* — Shuangyi Abu Ali

(57) ABSTRACT

The present disclosure discloses a nanoporous ceramic for an atomization core, and a preparation method thereof. The nanoporous ceramic includes: nano-silica 1 to 60 parts, a ceramic powder 10 to 80 parts, a pore-forming agent 1 to 50 parts, and a sintering additive 1 to 40 parts. The preparation method includes: (1) weighing raw materials, and mixing and ball-milling the raw materials in a ball mill; (2) bake-drying the ball-milled raw materials to obtain a dried mixed powder; (3) adding the dried mixed powder to molten paraffin under stirring, and continuously stirring a resulting mixture to obtain a paraffin slurry; (4) injecting the paraffin slurry into a mold, cooling the mold for forming, and performing demolding to obtain a paraffin mold; (5) preheating the paraffin mold for paraffin removal to obtain a paraffin-removed sample; and (6) sintering and cooling the paraffin-removed sample to obtain the nanoporous ceramic.

8 Claims, No Drawings

NANOPOROUS CERAMIC FOR ATOMIZATION CORE AND PREPARATION METHOD THEREOF

CROSS-REFERENCE TO RELATED APPLICATIONS

The present application is a continuation application of PCT application No. PCT/CN2021/128933 filed on Nov. 5, 2021, which claims the benefit of Chinese Patent Application No. 202011507967.0 filed on Dec. 18, 2020 and Chinese Patent Application No. 202011561865.7 filed on Dec. 25, 2020. The contents of all of the aforementioned applications are incorporated by reference herein in their entirety.

TECHNICAL FIELD

The present disclosure belongs to the technical field of atomization cores, and in particular relates to a nanoporous ceramic for an atomization core and a preparation method thereof.

BACKGROUND

Atomization cores are mainly used in electronic atomizers, and can heat and atomize a liquid to be atomized into an aerosol, a steam, or a vapor mist, which facilitates a user to inhale. The liquid to be atomized can be an e-liquid or a drug-containing solution for healthcare.

The existing atomization cores include heating elements made of a porous ceramic as a substrate, and a porous ceramic heating element is produced mainly by sintering a porous ceramic substrate at a low temperature. In the existing preparation methods of porous ceramic atomization cores, conventional ceramic powders are ground and mixed to obtain a ceramic powder material, and a sintering temperature is reduced by adding a glass powder or quartz sand that has a low softening temperature point. However, products prepared by the existing preparation methods exhibit poor resistance to cold and hot shock. A ceramic will crack and undergo oil leakage in repeated use. In the case of an unstable structure of a ceramic, impurities and heavy metals inside the ceramic are easily separated and admixed into a liquid to be atomized, which causes potential harm to human bodies. In addition, due to a low sintering temperature, a porosity is usually reduced to ensure a structural strength of a product. However, when a product has a low porosity, the product easily undergoes carbon deposits to produce odor during use.

SUMMARY

Technical Problem

The technical problem to be solved by the present disclosure is to provide a nanoporous ceramic for an atomization core and a preparation method thereof to overcome the shortcoming that a high porosity and a high strength cannot be achieved at the same time in the prior art and to solve the problem that, in the case of an unstable structure of a ceramic, impurities and heavy metals inside the ceramic are easily separated and admixed into a liquid to be atomized, which causes potential harm to human bodies.

Technical Solutions

A technical solution of the present disclosure is to provide a nanoporous ceramic for an atomization core including the following components in parts by weight: nano-silica 1 to 60 parts, a ceramic powder 10 to 80 parts, a pore-forming agent 1 to 50 parts, and a sintering additive 1 to 40 parts.

Preferably, the nanoporous ceramic for an atomization core includes the following components in parts by weight: the nano-silica 5 to 40 parts, the ceramic powder 20 to 70 parts, the pore-forming agent 5 to 30 parts, and the sintering additive 1 to 20 parts.

Preferably, the nano-silica includes colloidal nano-silica or powdery nano-silica, nanoparticles of the nano-silica have a primary particle size of 10 nm to 150 nm, and an amount of the colloidal nano-silica is calculated based on solid silica in the colloidal nano-silica.

Preferably, the ceramic powder includes at least one selected from the group consisting of kaolin, diatomaceous earth, aluminum oxide, silicon nitride, silicon carbide, quartz sand, glass sand, clay, and a feldspar powder.

Preferably, the pore-forming agent includes at least one selected from the group consisting of graphite, a starch, wheat flour, bean flour, a polystyrene microsphere, a polymethyl methacrylate microsphere, a carbonate, an ammonium salt, sucrose, and a fiber, and the pore-forming agent has a particle size of 1 μm to 200 μm.

Preferably, the pore-forming agent is flake graphite with a particle size of 1 μm to 20 μM.

Preferably, the sintering additive includes at least one selected from the group consisting of boron oxide, boric acid, oleic acid, stearic acid, sodium silicate, calcium oxide, iron oxide, and titanium oxide.

Another technical solution of the present disclosure is to provide a preparation method of a nanoporous ceramic for an atomization core including the following steps:

(1) weighing raw materials including nano-silica, a ceramic powder, a pore-forming agent, and a sintering additive according to a formula, and mixing and ball-milling the raw materials in a ball mill;
(2) oven-drying the ball-milled raw materials obtained in step (1) to obtain a dried mixed powder;
(3) heating paraffin to molten paraffin, adding the dried mixed powder to the molten paraffin under stirring, and continuously stirring a resulting mixture for 1 hour to 8 hours to obtain a paraffin slurry;
(4) injecting the paraffin slurry into a mold prepared in advance, cooling the mold for forming, and performing demolding to obtain a paraffin mold;
(5) preheating the paraffin mold for paraffin removal to obtain a paraffin-removed sample; and
(6) sintering the paraffin-removed sample to obtain the nanoporous ceramic, wherein the sintering includes heating, temperature-holding, and cooling.

Preferably, in step (1), the ball mill has a rotational speed of 150 rpm to 500 rpm, the ball-milling is conducted for 1 hour to 10 hours; and a milling material has a diameter of 1 mm to 50 mm.

Preferably, in step (2), the oven-drying is conducted at a temperature of 60° C. to 150° C. for at least 1 hour, the paraffin has a melting point of 50° C. to 120° C., and the paraffin is added at an amount 10% to 60% by weight based on a weight of the dried mixed powder.

Preferably, in step (5), the paraffin removal is conducted at a temperature of 400° C. to 800° C. for 2 hours to 12 hours.

Preferably, in step (6), the sintering is conducted at a temperature of 600° C. to 1,500° C. with a heating rate of 1° C./min to 10° C./min and a holding time of 2 hours to 12 hours.

Preferably, in step (6), the sintering is conducted in a protective atmosphere, and the protective atmosphere is one or more selected from the group consisting of a reductive hydrogen atmosphere and an inert atmosphere.

Beneficial Effects

During the preparation of the nanoporous ceramic, a specified proportion of a nano-silica material is introduced. Nano-silica is mixed with a micro-level ceramic powder according to a specified ratio, and a micro-nano composite structure is formed through a curing reaction during calcination. Because nano-silica has an ultra-high specific surface area and a large number of hydroxyl groups on the surface, a sintering temperature can be effectively reduced when the nano-silica is subjected to a solid-state reaction with the ceramic powder. At the same time, nano-silica can maintain high strength of the product under high porosity conditions. A multi-hydroxyl structure on the surface of nano-silica promotes the solid-state reaction between the ceramic powders and improves the conversion efficiency of an aluminosilicate. The formation of the micro-nano composite structure improves the stability of a porous ceramic skeleton structure, and thus the porous ceramic skeleton has the characteristics of high strength, low sintering temperature, and high porosity. In addition, the porosity can be adjusted by controlling an amount of the pore-forming agent in a range of 30% to 65%, such that a product has excellent hot shock resistance and stable performance. Under the premise of a high strength and a stable internal structure, the nanoporous ceramic is not easy to crack, which solves the problem that a ceramic will crack and undergo oil leakage in repeated use; and the structural stability makes impurities and heavy metals not easily separated during use of a product, which prevents impurities or heavy metals from exceeding standards. In addition, the high porosity solves the problem that a product easily undergoes carbon deposits to produce odor during use.

DETAILED DESCRIPTION

The present disclosure will be further described in detail below in conjunction with embodiments.

The present disclosure provides a nanoporous ceramic for an atomization core, including the following components in parts by weight: nano-silica 1 to 60 parts, a ceramic powder 10 to 80 parts, a pore-forming agent 1 to 50 parts, and a sintering additive 1 to 40 parts. In addition, in order to achieve a better effect, the nanoporous ceramic for an atomization core includes the following components in parts by weight: the nano-silica 5 to 40 parts, the ceramic powder 20 to 70 parts, the pore-forming agent 5 to 30 parts, and the sintering additive 1 to 20 parts.

The nano-silica includes colloidal nano-silica or powdery nano-silica, nanoparticles of the nano-silica have a primary particle size of 10 nm to 150 nm, and an amount of the colloidal nano-silica is calculated based on solid silica in the colloidal nano-silica. The nano-silica and the micro-ceramic powder form a micro-nano composite structure through a curing reaction during calcination. Because the nano-silica has an ultra-high specific surface area and a large number of hydroxyl groups on the surface, a sintering temperature can be effectively reduced when the nano-silica is subjected to a solid-state reaction with the ceramic powder. The nano-silica allows a product to possess both a high strength and a high porosity. Under the premise of a high strength and a stable internal structure, the nanoporous ceramic is not easy to crack, and impurities and heavy metals are not easily separated during use of the nanoporous ceramic.

The ceramic powder includes at least one selected from the group consisting of kaolin, diatomaceous earth, aluminum oxide, silicon nitride, silicon carbide, quartz sand, glass sand, clay, and a feldspar powder.

The pore-forming agent includes at least one selected from the group consisting of graphite, a starch, wheat flour, bean flour, a polystyrene microsphere, a polymethyl methacrylate microsphere, a carbonate, an ammonium salt, sucrose, and a fiber, and the pore-forming agent has a particle size of 1 μm to 200 μm.

Preferably, the pore-forming agent is flake graphite with a particle size of 1 μm to 20 The pore-forming agent is used so that in the case where the nano-silica ensures a high strength, an amount of the pore-forming agent can be adjusted to control the porosity in a range of 30% to 65%. The high porosity in the atomization core allows a liquid to be atomized to easily penetrate, conduct, or circulate during use of the atomization core, and the atomization core is not prone to carbon deposits to produce odor.

The sintering additive includes at least one selected from the group consisting of boron oxide, boric acid, oleic acid, stearic acid, sodium silicate, calcium oxide, iron oxide, and titanium oxide.

The present disclosure also provides a preparation method of a nanoporous ceramic for an atomization core, including the following steps:

(1) weighing raw materials including nano-silica, a ceramic powder, a pore-forming agent, and a sintering additive according to a formula, and placing the raw materials in a ball mill for mixing and ball-milling;

(2) oven-drying the ball-milled raw materials obtained in step (1) to obtain a dried mixed powder;

(3) heating paraffin to molten paraffin, adding the dried mixed powder to the molten paraffin under stirring, and continuously stirring a resulting mixture for 1 hour to 8 hours to obtain a paraffin slurry;

(4) injecting the paraffin slurry into a mold prepared in advance, cooling the mold for forming, and performing demolding to obtain a paraffin mold;

(5) preheating the paraffin mold for paraffin removal to obtain a paraffin-removed sample; and (6) sintering the paraffin-removed sample to obtain the nanoporous ceramic, wherein the sintering includes heating, temperature-holding, and cooling.

In addition, in step (1), the ball mill has a rotational speed of 150 rpm to 500 rpm, the ball-milling is conducted for 1 hour to 10 hours, and a milling material has a diameter of 1 mm to 50 mm.

In addition, in step (2), the oven-drying is conducted at a temperature of 60° C. to 150° C. for at least 1 hour, the paraffin has a melting point of 50° C. to 120° C., and the paraffin is added at an amount 10% to 60% by weight based on a weight of the dried mixed powder.

In addition, in step (5), the paraffin removal is conducted at a temperature of 400° C. to 800° C. for 2 hours to 12 hours.

In addition, in step (6), the sintering is conducted at a temperature of 600° C. to 1,500° C. with a heating rate of 1° C./min to 10° C./min and a holding time of 2 hours to 12 hours.

In addition, in step (6), the sintering is conducted in a protective atmosphere, and the protective atmosphere is one or more selected from the group consisting of a reductive hydrogen atmosphere and an inert atmosphere. Although the sintering of a ceramic alone can be conducted in an air atmosphere, if a one-piece sintered metal resistance wire is used for heating, the sintering needs to be conducted in a protective atmosphere to prevent the oxidation of the metal resistance wire during the sintering. The protective atmosphere can be a reductive hydrogen atmosphere or an inert atmosphere, and the inert atmosphere includes one or more selected from the group consisting of a nitrogen atmosphere and an argon atmosphere. The sintering atmosphere does not affect the performance of the nanoporous ceramic material according to the present disclosure.

IMPLEMENTATIONS OF THE PRESENT DISCLOSURE

The present disclosure will be described in detail below in conjunction with specific examples.

Example 1

Specifically, a nanoporous ceramic for an atomization core in this example of the present disclosure includes the following components in parts by weight: nano-silica: 15 parts, kaolin: 60 parts, flake graphite with a particle size of 2 μm: 20 parts, sodium silicate 4 parts, and oleic acid: 1 part.

Example 2

Specifically, a preparation method of a nanoporous ceramic for an atomization core in this example of the present disclosure includes the following steps.

(1) Raw materials including 15 parts by weight of nano-silica, 60 parts by weight of kaolin, 20 parts by weight of a pore-forming agent, 4 parts by weight of sodium silicate, and 1 part by weight of oleic acid were weighed, and mixed and ball-milled in a ball mill, where the nano-silica was a silica sol with a particle size of 150 nm, the kaolin had a mesh size of 1,000 mesh, and the pore-forming agent was flake graphite with a particle size of 2 μm; the ball mill had a rotational speed of 350 rpm, the ball-milling was conducted for 10 hours, and a milling material had a diameter of 10 mm.

(2) The ball-milled raw materials obtained in step (1) was oven-dried in an oven at a temperature of 60° C. for 12 hours to obtain a dried mixed powder.

(3) Paraffin was weighed at an amount 40% by weight based on a total weight of the dried mixed powder obtained in step (2) and heated to molten paraffin, and then the dried mixed powder was added into the molten paraffin under stirring, and a resulting mixture was further stirred and subjected to compounding at a temperature of 65° C. for 6 hours to obtain a paraffin slurry, where the paraffin had a melting point of 60° C.

(4) The paraffin slurry was injected into a mold prepared in advance, the mold was cooled for forming, and then demolding was performed to obtain a paraffin mold.

(5) The paraffin mold was heated to 400° C. in a furnace with an air atmosphere to allow paraffin removal for 6 hours to obtain a paraffin-removed sample.

(6) The paraffin-removed sample was placed in a furnace with an air atmosphere, sintered at a temperature of 950° C. with a heating rate of 3° C./min and a holding time of 4 hours, and then cooled to normal temperature to obtain the nanoporous ceramic.

Comparative Example

This comparative example was different from Example 1 or 2 in that:

15 parts by weight of quartz sand with a mesh size of 1,000 mesh were used instead of 15 parts by weight of nano-silica, and the quartz sand was irregularly-distributed micro-silica.

The porous ceramic substrates prepared in Example 1 or Example 2 and the comparative example were tested in accordance with the national standard for a test method of compressive strength of a porous ceramic, and test results were as follows:

| | Compressive strength/MPa |
|---|---|
| Example 1 or 2 | 22.4 |
| Comparative Example | 14.5 |

It can be seen from the above data that, in the comparative example, a same amount of quartz sand is used instead of nano-silica, and the composition of the overall material is identical and when irregularly-distributed micro-silica is used instead of monodispersed nano-silica, a strength of the prepared porous ceramic is significantly reduced, indicating that nano-silica is relatively active during the sintering and the ceramic obtained after the solid-state reaction has a stable structure.

INDUSTRIAL APPLICABILITY

The above are merely preferred examples of the present disclosure, and all equivalent changes and modifications made according to the scope of the claims of the present disclosure shall fall within the scope covered by the claims of the present disclosure.

The invention claimed is:

1. A preparation method of a nanoporous ceramic for an atomization core, comprising the following steps:

(1) weighing raw materials including 5 to 40 parts of nano-silica, 20 to 70 parts of a ceramic powder, 5 to 30 parts of a pore-forming agent, and 1 to 20 parts of a sintering additive, and mixing and ball-milling the raw materials in a ball mill, wherein the nano-silica comprises colloidal nano-silica or powdery nano-silica, nanoparticles of the nano-silica have a primary particle size of 10 nm to 150 nm, and an amount of the colloidal nano-silica is calculated based on solid silica in the colloidal nano-silica; the ceramic powder comprises at least one selected from the group consisting of kaolin, diatomaceous earth, aluminum oxide, silicon nitride, silicon carbide, quartz sand, glass sand, clay, and a feldspar powder; and the sintering additive comprises at least one selected from the group consisting of boron oxide, boric acid, oleic acid, stearic acid, sodium silicate, calcium oxide, iron oxide, and titanium oxide;

(2) oven-drying the ball-milled raw materials obtained in step (1) to obtain a dried mixed powder;

(3) heating paraffin to molten paraffin, adding the dried mixed powder to the molten paraffin under stirring, and continuously stirring a resulting mixture for 1 hour to 8 hours to obtain a paraffin slurry;

(4) injecting the paraffin slurry into a mold prepared in advance, cooling the mold for forming, and performing demolding to obtain a paraffin mold;

(5) preheating the paraffin mold for paraffin removal to obtain a paraffin-removed sample; and (6) sintering the paraffin-removed sample to obtain the nanoporous ceramic, wherein the sintering comprises heating, temperature-holding, and cooling.

2. The preparation method of a nanoporous ceramic for an atomization core according to claim 1, wherein in step (1), the ball mill has a rotational speed of 150 rpm to 500 rpm, the ball-milling is conducted for 1 hour to 10 hours, and a milling material has a diameter of 1 mm to 50 mm.

3. The preparation method of a nanoporous ceramic for an atomization core according to claim 1, wherein in step (2), the oven-drying is conducted at a temperature of 60° C. to 150° C. for at least 1 hour, the paraffin has a melting point of 50° C. to 120° C., and the paraffin is added at an amount 10% to 60% by weight based on a weight of the dried mixed powder.

4. The preparation method of a nanoporous ceramic for an atomization core according to claim 1, wherein in step (5), the paraffin removal is conducted at a temperature of 400° C. to 800° C. for 2 hours to 12 hours.

5. The preparation method of a nanoporous ceramic for an atomization core according to claim 1, wherein in step (6), the sintering is conducted at a temperature of 600° C. to 1,500° C. with a heating rate of 1° C./min to 10° C./min and a holding time of 2 hours to 12 hours.

6. The preparation method of a nanoporous ceramic for an atomization core according to claim 1, wherein in step (6), the sintering is conducted in a protective atmosphere, and the protective atmosphere is one or more selected from the group consisting of a reductive hydrogen atmosphere and an inert atmosphere.

7. The preparation method of a nanoporous ceramic for an atomization core according to claim 1, wherein the pore-forming agent comprises at least one selected from the group consisting of graphite, a starch, wheat flour, bean flour, a polystyrene microsphere, a polymethyl methacrylate microsphere, a carbonate, an ammonium salt, sucrose, and a fiber, and the pore-forming agent has a particle size of 1 μm to 200 μm.

8. The preparation method of a nanoporous ceramic for an atomization core according to claim 7, wherein the pore-forming agent is flake graphite with a particle size of 1 μm to 20 μm.

* * * * *